F. SONDERMEYER & F. SCHINDLER.
COMBINED SACK-HOLDER AND SACK-FILLER.

No. 186,892.

Patented Jan. 30, 1877.

WITNESSES:
H. Rydquist
J. H. Scarborough

INVENTOR:
F. Sondermeyer
F. Schindler
BY
[signature]
ATTORNEYS.

N. PETERS, PHOTO-LITHOGRAPHER, WASHINGTON, D. C.

UNITED STATES PATENT OFFICE.

FRIEDRICK SONDERMEYER AND FREDERICK SCHINDLER, OF PERRYVILLE, MISSOURI.

IMPROVEMENT IN COMBINED SACK-HOLDER AND SACK-FILLER.

Specification forming part of Letters Patent No. 186,892, dated January 30, 1877; application filed November 4, 1876.

*To all whom it may concern:*

Figure 1:
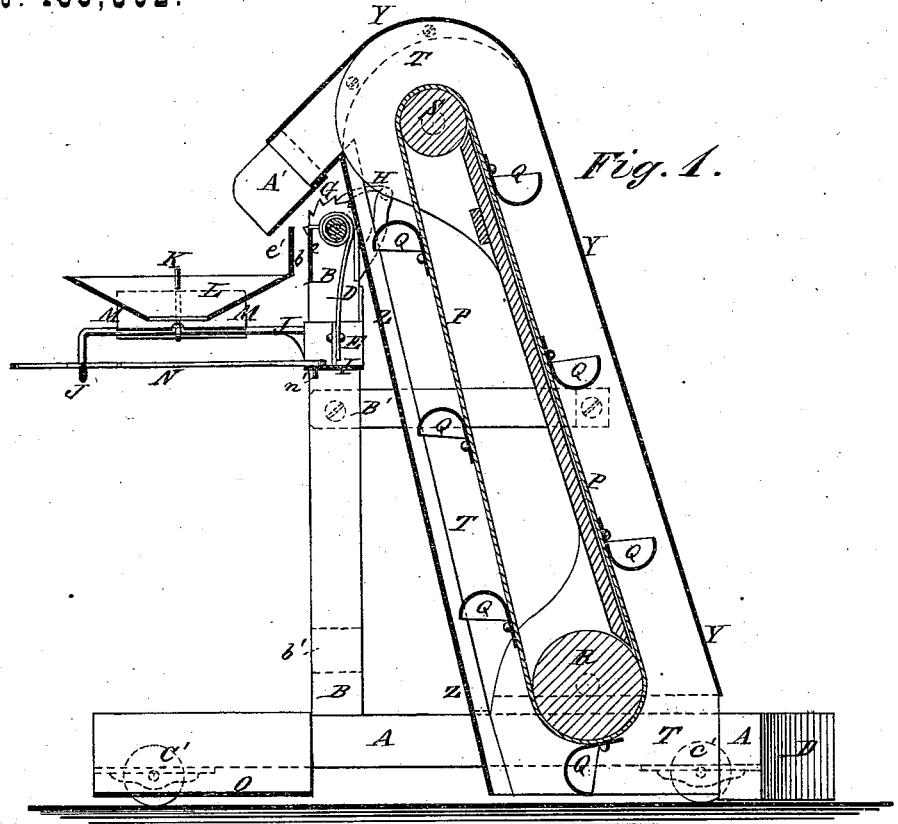
Figure 2:
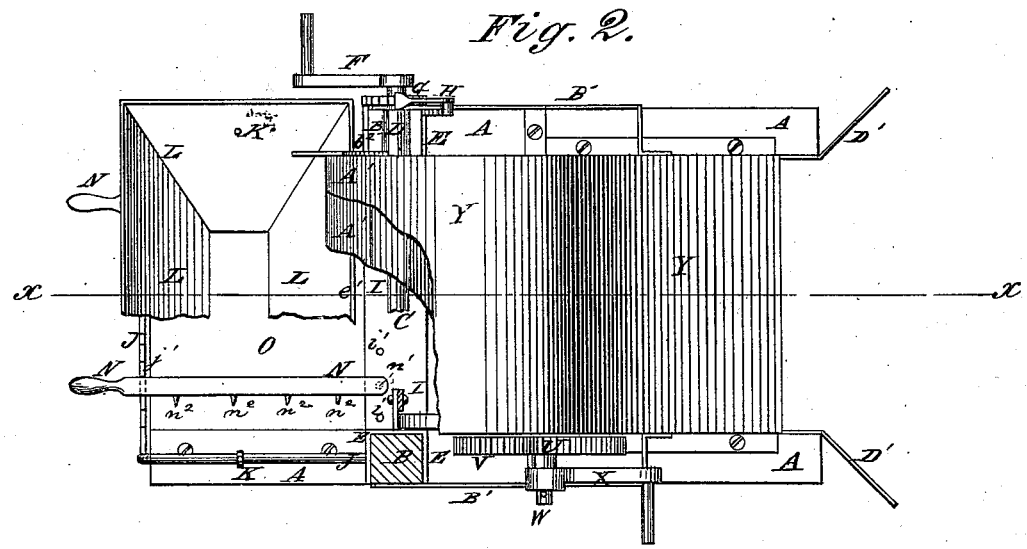

Be it known that we, FRIEDRICK SONDERMEYER and FREDERICK SCHINDLER, of Perryville, in the county of Perry and State of Missouri, have invented a new and useful Improvement in Combined Sack-Holder and Sack-Filler, of which the following is a specification:

Figure 1 is a vertical section of our improved machine, taken through the line $x\,x$, Fig. 2. Fig. 2 is a top of the same, part being broken away to show the construction.

Similar letters of reference indicate corresponding parts.

The object of this invention is to furnish an improved machine for holding sacks while being filled, and for raising grain or other substances from the floor or ground and discharging it into the sacks, and which shall be simple in construction, convenient in use, and effective in operation, and may be used for filling large and small sacks, as may be desired.

The invention will first be described in connection with the drawing, and then pointed out in the claims.

A are the sills or base-bars of the machine, to which, in the rear of their centers, are attached the lower ends of two posts, B. The posts B are connected near their lower ends by a cross-bar, $b^1$, and at the outer sides of their upper ends by a thin cross-bar, $b^2$, so as to leave space for the shaft C, that revolves in bearings attached to the upper ends of the said posts B. To the shaft C are attached the upper ends of two straps or cords, D, the lower ends of which are attached to the slides E, that slide up and down upon the posts B, as the said shaft is turned in one or the other direction by the crank F, attached to one of its ends. To the shaft C is attached a ratchet-wheel, G, with the teeth of which engages the pawl H, pivoted to the post B, or to an arm attached to said post, to hold the shaft C in any position into which it may be adjusted. The lower parts of the slides E are connected by a cross-bar, I. To the outer sides of the slides E are attached the ends of the U-bar J, the outer parts of the arms of which are bent downward, to bring its middle part to the same level as the bar I. To the middle parts of the arms of the U-bar J are rigidly attached upwardly-projecting pins K, to pass through the ends of the hopper L, and keep it in place. To the ends of the hopper L are attached downwardly-projecting plates or arms M, the lower ends of which are concaved, or are flanged and concaved, to rest upon the arms of the U-bar J, and thus support the hopper L firmly. One side of the hopper L is provided with an upwardly-projecting plate, $e'$, to prevent the grain, when thrown into said hopper, from flying out at the side. The hopper L is arranged with the plate $e'$ inward, as shown in Fig. 1, when the grain is to be put into the hopper by hand, and with the plate $e'$ outward when the grain is to be discharged into the hopper by an elevator. N are two bars, upon the inner ends of which are formed, or to them are attached, pins or hooks $n^1$, which are inserted in holes $i$, formed in the bar I. Several holes, $i'$, are formed in the bar I, to receive the hooks or pins $n^1$ of the bars N, so that the ends of the said bars N may be adjusted wider apart or closer together, according to the width of the mouth of the sacks to be filled. The outer parts of the bars N rest upon the middle part of the U-bar J, which is provided with ratchet-teeth $j'$, to receive the bars N, and hold them at any desired distance apart. Upon the outer sides of the bars N are formed four or more teeth, $n^2$, to receive and hold the mouth of the sacks to be filled, the two inner teeth $n^2$ being designed to receive small sacks, and all the teeth to receive large sacks.

The bottoms of the sacks, while being filled, rest upon a platform, O, attached to the rear parts of the sills A, and which also act as a connecting-bar, to keep the said sills in their proper relative positions. P is the elevator-belt, to which the brackets Q are attached, and which passes around the roller or shaft R, the journals of which revolve in bearings attached to the sills A, in such a position that the buckets Q may work close to the floor or ground upon which the grain lies. The belt P also passes around a roller or shaft, S, the journals of which work in bearings in the side boards T of the elevator. One of the journals of the roller S projects, and to it is attached a small gear-wheel, U, into the teeth of which mesh the teeth of a larger gear-wheel, V, which revolves upon the gudgeon W, attached to the side board T, and has a crank, X, attached to it, by which the elevator is operated. The front and top of the elevator are inclosed with a casing, Y, and its rear side is inclosed with a casing, Z, which guides the grain that fails to enter the discharge-spout A' back into such a position beneath the elevator that the buckets Q may again take it up. The discharge-spout A' projects into such a position as to discharge the grain into the hopper L. The lower ends of the side boards T of the elevator are attached to the sills A, and the said elevator is strengthened in position by the brace-bars B'; the forward ends of which are attached to the side boards T of said elevator, and their rear ends are attached to the posts B. To the sills A are pivoted small wheels or rollers C', so that the machine can be easily moved forward to the pile of grain, as the said grain is raised by the elevator. To the forward ends of the sills A are attached outwardly-inclined plates D', which, as the machine is moved forward, guide the grain inward, so that it may be taken up by the elevator.

Having thus described our invention, we claim as new and desire to secure by Letters Patent—

1. The combination, with hopper L, having arms M, and the U-bar J, having pins K, of the slides E I, connected by cords with shaft C, as and for the purpose described.

2. The combination, with an incased elevator, of a wheeled base, open in front, and there provided with outwardly-inclined plates D', as shown and described, for the purpose specified.

FRIEDRICK SONDERMEYER.
FREDERICK SCHINDLER.

Witnesses:
FRITZ STROBEL,
JOSEPH SCHINDLER.